(12) United States Patent
Chen et al.

(10) Patent No.: US 10,987,776 B2
(45) Date of Patent: Apr. 27, 2021

(54) CALIBRATION METHOD AND NON-TRANSITORY COMPUTER-READABLE STORAGE MEDIUM STORING A PROGRAM OF CALIBRATION

(71) Applicant: EBARA CORPORATION, Tokyo (JP)

(72) Inventors: Pohan Chen, Tokyo (JP); Tadakazu Sone, Tokyo (JP); Kenichi Suzuki, Tokyo (JP); Hiroshi Sotozaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 386 days.

(21) Appl. No.: 15/989,662

(22) Filed: May 25, 2018

(65) Prior Publication Data
US 2018/0345454 A1 Dec. 6, 2018

(30) Foreign Application Priority Data

May 30, 2017 (JP) .............................. JP2017-106426

(51) Int. Cl.
*B24B 49/16* (2006.01)
*G06F 17/18* (2006.01)
*B24B 49/08* (2006.01)
*B24B 49/18* (2006.01)
*B24B 53/017* (2012.01)
*G06F 17/11* (2006.01)

(52) U.S. Cl.
CPC .............. *B24B 49/16* (2013.01); *B24B 49/08* (2013.01); *B24B 49/18* (2013.01); *B24B 53/017* (2013.01); *G06F 17/11* (2013.01); *G06F 17/18* (2013.01)

(58) Field of Classification Search
CPC ........... B24B 1/00; B24B 49/08; B24B 49/10; B24B 49/16; B24B 53/00; B24B 53/005; G01L 25/00; G01L 5/00; G01L 1/00; H01L 22/26
USPC ................................... 451/9, 10, 11, 56, 443
See application file for complete search history.

(56) References Cited

U.S. PATENT DOCUMENTS

| 5,422,478 | A | * | 6/1995 | Wlodarczyk | ...... | A61B 5/02154 |
| | | | | | | 250/227.21 |
| 6,609,950 | B2 | | 8/2003 | Kimura et al. | | |
| 7,416,474 | B2 | | 8/2008 | Terada et al. | | |
| 8,152,594 | B2 | | 4/2012 | Saito et al. | | |

(Continued)

FOREIGN PATENT DOCUMENTS

| JP | 2005-311063 A | 11/2005 |
| JP | 2016-144860 A | 8/2016 |

*Primary Examiner* — Eileen P Morgan
*Assistant Examiner* — Makena S Markman
(74) *Attorney, Agent, or Firm* — Pearne & Gordon LLP

(57) ABSTRACT

A method, which can accurately determine in a short time a relationship between a load of a dresser and a pressure of a gas supplied to an air cylinder, is disclosed. The method includes determining a first contact point where a load measurement device is brought into contact with a polishing table, calculating a relational expression composed to a quadratic function showing a relationship between a measured load and a measured pressure, determining a second contact point where the dresser is brought into contact with a polishing surface of a polishing pad, calculating an amount of correction from the pressure of the gas at the first contact point and the pressure of the gas at the second contact point, and correcting the relational expression based on the calculated amount of correction.

8 Claims, 10 Drawing Sheets

(56) References Cited

U.S. PATENT DOCUMENTS

| | | | |
|---|---|---|---|
| 8,517,796 B2* | 8/2013 | Shinozaki | B24B 53/017 |
| | | | 451/5 |
| 8,795,032 B2 | 8/2014 | Miyazaki et al. | |
| 9,108,292 B2* | 8/2015 | Shimano | B24B 53/005 |
| 9,156,130 B2 | 10/2015 | Shimano et al. | |
| 9,403,255 B2 | 8/2016 | Fukushima et al. | |
| 10,369,675 B2* | 8/2019 | Matsuo | B24B 37/00 |
| 10,449,654 B2* | 10/2019 | Campolo | B24B 27/027 |
| 2010/0081361 A1* | 4/2010 | Fukuda | B24B 53/017 |
| | | | 451/5 |
| 2011/0159783 A1* | 6/2011 | Fukushima | B24B 49/10 |
| | | | 451/11 |
| 2015/0221531 A1 | 8/2015 | Tanaka | |
| 2018/0297170 A1* | 10/2018 | Chen | B24B 49/16 |

* cited by examiner

CALIBRATION METHOD AND NON-TRANSITORY COMPUTER-READABLE STORAGE MEDIUM STORING A PROGRAM OF CALIBRATION

CROSS REFERENCE TO RELATED APPLICATION

This document claims priority to Japanese Patent Application Number 2017-106426 filed May 30, 2017, the entire contents of which are hereby incorporated by reference.

BACKGROUND

In recent years, semiconductor devices have become finer and finer, and device structures have become more complicated. A surface planarization is a very important process in a fabrication process of the semiconductor devices. A typical technique used in the surface planarization is chemical mechanical polishing (CMP). This chemical mechanical polishing is a process of polishing a surface of a substrate by bringing the substrate into sliding contact with a polishing surface of a polishing pad while supplying a polishing liquid containing abrasive grains such as silica ($SiO_2$) onto the polishing surface.

The chemical mechanical polishing is performed using a CMP apparatus. The CMP apparatus includes a polishing table having an upper surface to which a polishing pad is attached, and a top ring for holding a substrate such as a semiconductor wafer as an object to be polished. While the polishing table and the top ring are rotated about their own axes respectively, the top ring presses the substrate against a polishing surface (i.e., an upper surface) of the polishing pad at a predetermined pressure to bring the substrate into sliding contact with the polishing pad. The polishing liquid is supplied onto the polishing surface of the polishing pad, and thus the substrate is polished in a state where the polishing liquid is present between the substrate and the polishing pad. The surface of the substrate is planarized by a combination of a chemical polishing action by the alkali and a mechanical polishing action by the abrasive grains.

After the substrate has been polished, abrasive grains and polishing debris are attached to the polishing surface (upper surface) of the polishing pad, and further the properties of the polishing pad are changed to cause deterioration in polishing performance. Therefore, as the substrates are repeatedly polished by the same polishing pad, a polishing rate is lowered and nonuniform polishing action is caused. Thus, a dressing apparatus for regenerating the deteriorated polishing surface of the polishing pad is provided adjacent to the polishing table. This dressing apparatus regenerates the polishing surface of the polishing pad by slightly scraping off the polishing surface of the polishing pad.

The dressing apparatus includes a dresser for dressing the polishing surface of the polishing pad, and an air cylinder for pressing the dresser against the polishing pad. Hard abrasive grains such as diamond particles are fixed to a lower surface of the dresser. The lower surface of the dresser constitutes a dressing surface configured to condition (i.e., dress) the polishing surface of the polishing pad.

When dressing the polishing pad, the dresser is pressed against the polishing pad while rotating the polishing table for supporting the polishing pad and the dresser, respectively, and supplying pure water onto the polishing surface of the polishing pad. The dressing surface of the dresser is brought into sliding contact with the polishing surface of the polishing pad, thereby dressing the polishing surface.

During dressing, the polishing surface of the polishing pad is scraped off by the dresser. A pressing force of the dresser against the polishing pad, i.e., a load of the dresser applied by the air cylinder greatly affects the life of the polishing pad. Therefore, it is necessary to accurately control the load of the dresser.

In the above configuration, the load of the dresser depends on a pressure of air supplied to the air cylinder. Therefore, an operation (calibration operation) for determining a relationship between the load of the dresser and the pressure of air supplied to the air cylinder is required.

The above-described calibration operation is performed mainly before shipping of the CMP apparatus including the dressing apparatus (before the CMP apparatus is delivered to the customer) and when replacing the polishing pad. However, since this conventional calibration operation is performed by an operator in a subjective manner, it takes much time for the calibration operation. Furthermore, it is desirable to improve the accuracy of the calibration operation.

SUMMARY OF THE INVENTION

According to an embodiment, there is provided a method and a non-transitory computer-readable storage medium storing a program which can be accurately determined in a short time a relationship between a load of a dresser and a pressure of a gas supplied to an air cylinder.

Embodiments, which will be described below, relate to a method for determining a relationship between a load of a dresser applied by an air cylinder and the pressure of a gas supplied to the air cylinder and a program for determining the relationship.

In an embodiment, there is provided a method of determining a relationship between a load of a dresser applied by an air cylinder and a pressure of a gas supplied to the air cylinder, comprising: lowering a load measurement device attached to a vertically-movable dresser drive shaft by the air cylinder to bring the load measurement device into contact with a polishing table; determining a first contact point where the load measurement device is brought into contact with the polishing table based on a relationship between a lowering distance of the load measurement device from a predetermined position and the pressure of the gas supplied to the air cylinder when lowering the load measurement device; pressing the load measurement device at the first contact point against the polishing table, and measuring a load acting on the load measurement device and the pressure of the gas while changing the load acting on the load measurement device within a predetermined load range; calculating a relational expression composed to a quadratic function showing a relationship between the measured load and the measured pressure; determining a second contact point where the dresser is brought into contact with a polishing surface of a polishing pad after attaching the dresser to the dresser drive shaft instead of the load measurement device and attaching the polishing pad to an upper surface of the polishing table; calculating an amount of correction from the pressure of the gas at the first contact point and the pressure of the gas at the second contact point; and correcting the relational expression based on the calculated amount of correction.

In an embodiment, wherein the determining the first contact point comprises: measuring the lowering distance of the load measurement device from the predetermined position a plurality of times, while changing the pressure of the gas supplied to the air cylinder; dividing a plurality of data points on a coordinate system specified from a measured lowering distance of the load measurement device and the pressure of the gas corresponding to the lowering distance into a non-contact-side group including a data point immediately after starting of the measurement and a contact-side group including a data point immediately before terminating of the measurement; performing a regression analysis on the plural data points belonging to the non-contact-side group to determine a first regression line represented by a linear function; performing the regression analysis on the plural data points belonging to the contact-side group to determine a second regression line represented by a linear function; and finding an intersection point of the first regression line with the second regression line to determine the intersection point as the first contact point.

In an embodiment, wherein the calculating the relational expression comprises performing a regression analysis on a plurality of data points on a coordinate system specified from the measured load and the measured pressure to calculate a regression expression represented by a quadratic function, and determining the regression expression as the relational expression.

In an embodiment, wherein the correcting the relational expression comprises: adding the calculated amount of correction to the measured pressure; measuring the pressure to which the amount of correction is added and a load acting on the dresser when the gas having a pressure to which the amount of correction is added is supplied to the air cylinder; performing a regression analysis on a plurality of data points on a coordinate system specified from the pressure to which the amount of correction is added and the measured load corresponding to the pressure to calculate a new relational expression composed of a quadratic function; and correcting the relational expression into a new relational expression.

In an embodiment, there is provided a non-transitory computer-readable storage medium storing a program of determining a relationship between a load of a dresser applied by an air cylinder and a pressure of a gas supplied to the air cylinder, the program for causing a computer to perform steps comprising: performing an operation of lowering a load measurement device attached to a vertically-movable dresser drive shaft by the air cylinder to bring the load measurement device into contact with a polishing table; determining a first contact point where the load measurement device is brought into contact with the polishing table based on a relationship between a lowering distance of the load measurement device from a predetermined position and the pressure of the gas supplied to the air cylinder when lowering the load measurement device; calculating a relational expression composed to a quadratic function showing a relationship between a measured load and a measured pressure based on the measured load acting on the load measurement device and the pressure of the gas, while changing the load acting on the load measurement device within a predetermined load range by pressing the load measurement device at the first contact point against the polishing table; determining a second contact point where the dresser attached to the dresser drive shaft instead of the load measurement device is brought into contact with a polishing surface of a polishing pad attached to an upper surface of the polishing table; calculating an amount of correction from the pressure of the gas at the first contact point and the pressure of the gas at the second contact point; and correcting the relational expression based on the calculated amount of correction.

In an embodiment, wherein the determining the first contact point comprises: dividing a plurality of data points on a coordinate system specified from a lowering distance of the load measurement device from a predetermined position measured a plurality of times and the pressure of the gas corresponding to the lowering distance into a non-contact-side group including a data point immediately after starting of the measurement and a contact-side group including a data point immediately before terminating of the measurement; performing a regression analysis on the plural data points belonging to the non-contact-side group to determine a first regression line represented by a linear function; performing the regression analysis on the plural data points belonging to the contact-side group to determine a second regression line represented by the linear function; and finding an intersection point of the first regression line with the second regression line to determine the intersection point as the first contact point.

In an embodiment, wherein the calculating the relational expression comprises performing a regression analysis on a plurality of data points on a coordinate system specified from the measured load and the measured pressure to calculate a regression expression represented by a quadratic function, and determining the regression expression to the relational expression.

In an embodiment, wherein the correcting the relational expression comprises: adding the calculated amount of correction to the measured pressure; performing a regression analysis on a plurality of data points on a coordinate system specified from the pressure to which the amount of correction is added and the load acting on the dresser when the gas having a pressure to which the amount of correction is added is supplied to the air cylinder to calculate a new relational expression composed of a quadratic function; and correcting the relational expression into a new relational expression.

According to the above-described embodiments, the first contact point and the second contact point can be accurately determined, and the relational expression composed of the quadratic function showing the relationship between the measured load and the measured pressure and the corrected relational expression can be better fitted to the actual measured values. Therefore, the relationship between the load of the dresser and the pressure of the gas supplied to the air cylinder can be accurately determined in a short time.

BRIEF DESCRIPTION OF THE DRAWINGS

Figure 1:
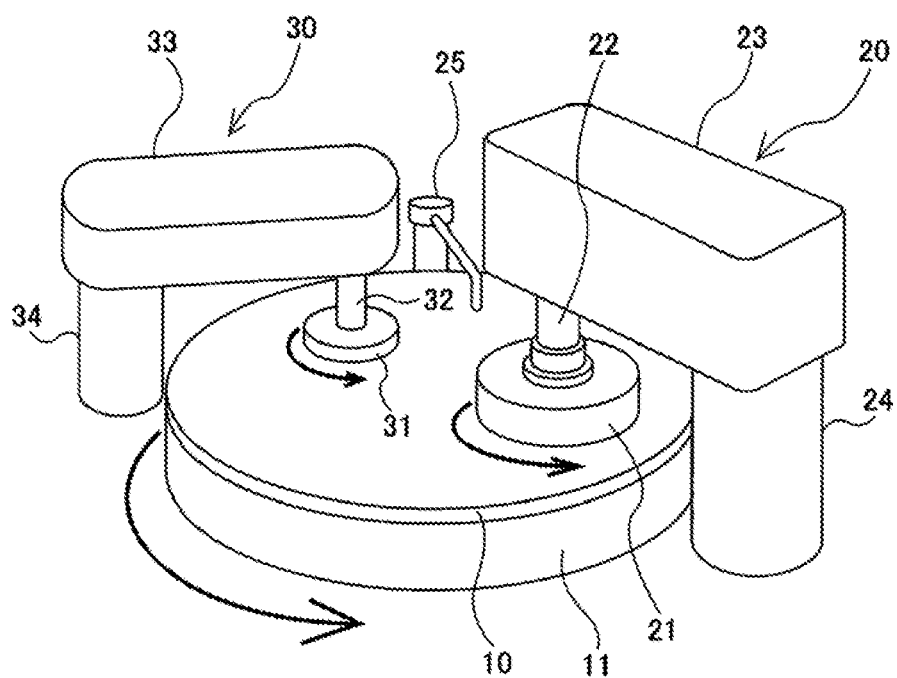
FIG. 1 is a perspective view showing a polishing apparatus.

Embodiments will be described below with reference to the drawings. Identical or corresponding structural elements are denoted by identical reference numerals and will not be described below repetitively.

FIG. 1 is a perspective view showing a polishing apparatus. The polishing apparatus includes a polishing table 11 for supporting a polishing pad 10, a top ring apparatus 20 for polishing a substrate (i.e., an object to be polished) such as a wafer by bringing the substrate into sliding contact with the polishing pad 10, and a dressing apparatus 30 for conditioning (i.e., dressing) the polishing pad 10.

The polishing pad 10 is attached to an upper surface of the polishing table 11, and an upper surface of the polishing pad 10 constitutes a polishing surface. The polishing table 11 is coupled to a motor (not shown), so that the polishing table 11 and the polishing pad 10 are rotated by this motor in a direction indicated by an arrow.

The top ring apparatus 20 includes a top ring 21 for holding the substrate and pressing the substrate against the upper surface of the polishing pad 10, a top ring drive shaft 22 coupled to the top ring 21, and a top ring swing arm 23 for rotatably holding the top ring drive shaft 22. The top ring swing arm 23 is supported by a top ring swing shaft 24.

A motor (not shown) coupled to the top ring drive shaft 22 is installed in the top ring swing arm 23. Rotation of this motor is transmitted to the top ring 21 through the top ring drive shaft 22, whereby the top ring 21 is rotated about the top ring drive shaft 22 in a direction indicated by an arrow.

A liquid supply mechanism 25 for supplying a polishing liquid and a dressing liquid onto the polishing surface of the polishing pad 10 is disposed adjacent to the top ring apparatus 20. The liquid supply mechanism 25 includes a plurality of supply nozzles (not shown) from which the polishing liquid and the dressing liquid are separately supplied onto the polishing surface of the polishing pad 10.

This liquid supply mechanism 25 serves as both a polishing-liquid supply mechanism for supplying the polishing liquid onto the polishing pad 10 and a dressing-liquid supply mechanism for supplying the dressing liquid (e.g., pure water) onto the polishing pad 10. The polishing-liquid supply mechanism and the dressing-liquid supply mechanism may be provided separately.

The top ring 21 has a lower surface that constitutes a substrate-holding surface for holding the substrate by a vacuum suction or the like. The top ring drive shaft 22 is coupled to a vertical actuator (not shown) such as an air cylinder. With this configuration, the top ring 21 is elevated and lowered by the vertical actuator through the top ring drive shaft 22.

The top ring swing shaft 24 is located radially outwardly of the polishing table 11. This top ring swing shaft 24 is configured to be rotatable, so that the top ring 21 is movable between a polishing position on the polishing pad 10 and a standby position outside the polishing pad 10.

Polishing of the substrate is performed as follows: The substrate is held on the lower surface of the top ring 21, and then the top ring 21 and the polishing table 11 are rotated, respectively. In this state, the polishing liquid is supplied onto the polishing surface of the polishing pad 10, and then the substrate is pressed against the polishing surface of the polishing pad 10 by the top ring 21. A surface (lower surface) of the substrate is polished by the mechanical polishing action by abrasive grains contained in the polishing liquid and the chemical polishing action by the polishing liquid.

Figure 2:
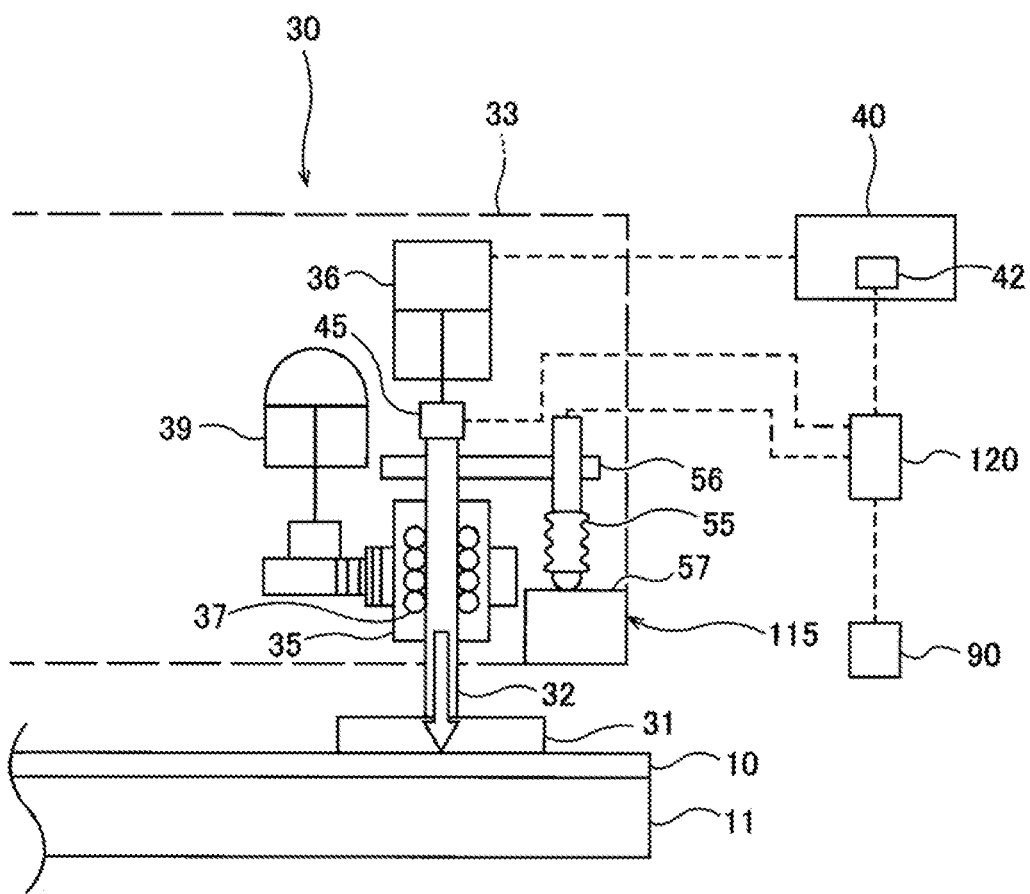
FIG. 2 is a schematic view showing a dressing apparatus.

FIG. 2 is a schematic view showing the dressing apparatus 30. The dressing apparatus 30 includes a dresser 31 configured to be brought into sliding contact with the polishing surface of the polishing pad 10, a dresser drive shaft 32 coupled to the dresser 31, and a dresser swing arm 33 for rotatably holding the dresser drive shaft 32. A lower surface of the dresser 31 constitutes a dressing surface configured to be brought into sliding contact with the polishing surface of the polishing pad 10. Hard abrasive grains such as diamond particles are fixed to the dressing surface.

The dresser swing arm 33 is supported by a dresser swing shaft 34 (see FIG. 1). A dresser rotation motor 39 coupled to the dresser drive shaft 32 is installed in the dresser swing arm 33. Rotation of this dresser rotation motor 39 is transmitted to the dresser 31 through the dresser drive shaft 32, whereby the dresser 31 is rotated about the dresser drive shaft 32 in a direction indicated by an arrow (see FIG. 1).

The dresser swing shaft 34 is coupled to a swing motor (not shown). The dresser 31 moves in a radial direction of the polishing surface of the polishing pad 10 by driving the swing motor. When dressing the polishing pad 10, the polishing table 11 and the dresser 31 are rotated, and the dresser 31 is pressed against the polishing pad 10 while the dressing liquid is supplied onto the polishing surface of the polishing pad 10. The dressing surface of the dresser 31 is brought into sliding contact with the polishing surface of the polishing pad 10, thereby conditioning the polishing surface. During dressing, the dresser 31 is moved in a reciprocating manner in a radial direction of the polishing pad 10.

As shown in FIG. 2, the dressing apparatus 30 includes an air cylinder 36 as a pressing mechanism for pressing the dresser 31 against the polishing pad 10 through the dresser drive shaft 32. The dresser drive shaft 32 is coupled to a linear guide mechanism 35 which allows the dresser drive shaft 32 to move straight in a longitudinal direction of the dresser drive shaft 32 while transmitting a torque to the dresser 31. An example of the linear guide mechanism 35 is a ball spline. The dresser rotation motor 39 is coupled to the dresser drive shaft 32 via the linear guide mechanism 35. The dresser 31 is rotated by this motor 39 through the dresser drive shaft 32.

The dressing apparatus 30 further includes a spring 37 coupled to the dresser drive shaft 32. This spring 37 is a member for balancing a weight of a movable portion including the dresser drive shaft 32 and the dresser 31 in the dressing apparatus 30. When there is no output of the air cylinder 36, i.e., there is no supply of air to the air cylinder 36, the spring 37 has a function of returning the dresser 31 upward by its own elastic force. Therefore, the spring 37 applies a force to the dresser drive shaft 32 in a direction opposite to a direction for pressing down the dresser 31 by the air cylinder 36, and thus biases the dresser 31 upward through the dresser drive shaft 32.

The dresser drive shaft 32 is coupled to the air cylinder (pressing mechanism) 36, and the air cylinder 36 presses the dresser 31 against the polishing pad 10 through the dresser drive shaft 32. The air cylinder 36 is a type of pneumatic actuator. An electropneumatic regulator 40 as a pressure regulator is connected to the air cylinder 36.

This electropneumatic regulator 40 regulates the pressure of pressurized air supplied from an air source (not shown), and supplies air having the regulated pressure to the air cylinder 36. A gas other than air may be used. The electropneumatic regulator 40 has a built-in pressure sensor (pressure measurement device) 42 for measuring the pressure of air supplied to the air cylinder 36.

A load cell (internal load measurement device or internal load cell) 45 is attached to the dresser drive shaft 32. The load cell 45 indirectly measures a pressing force of the dresser 31 against the polishing pad 10, i.e., a load of the dresser 31 applied by the air cylinder 36.

The dressing apparatus 30 includes a position sensor (displacement sensor) 55 for measuring a vertical position of the dresser 31, and a sensor target 57 arranged to face the position sensor 55. The position sensor 55 and the sensor target 57 constitute a displacement measurement device 115. The position sensor 55 is fixed to the dresser drive shaft 32 through a support member 56. This support member 56 is fixed to the dresser drive shaft 32, and the position sensor 55 moves together with the dresser drive shaft 32 in a vertical direction through the support member 56.

The sensor target 57 is fixed to an inner surface of a cover of the dresser swing arm 33. A probe (i.e., tip portion of the position sensor 55) of the position sensor 55 is configured to make contact with the sensor target 57. The position sensor 55 measures a relative vertical position of the dresser drive shaft 32 with respect to the sensor target 57, and thus indirectly measures a vertical position of the dresser 31.

Figure 3:
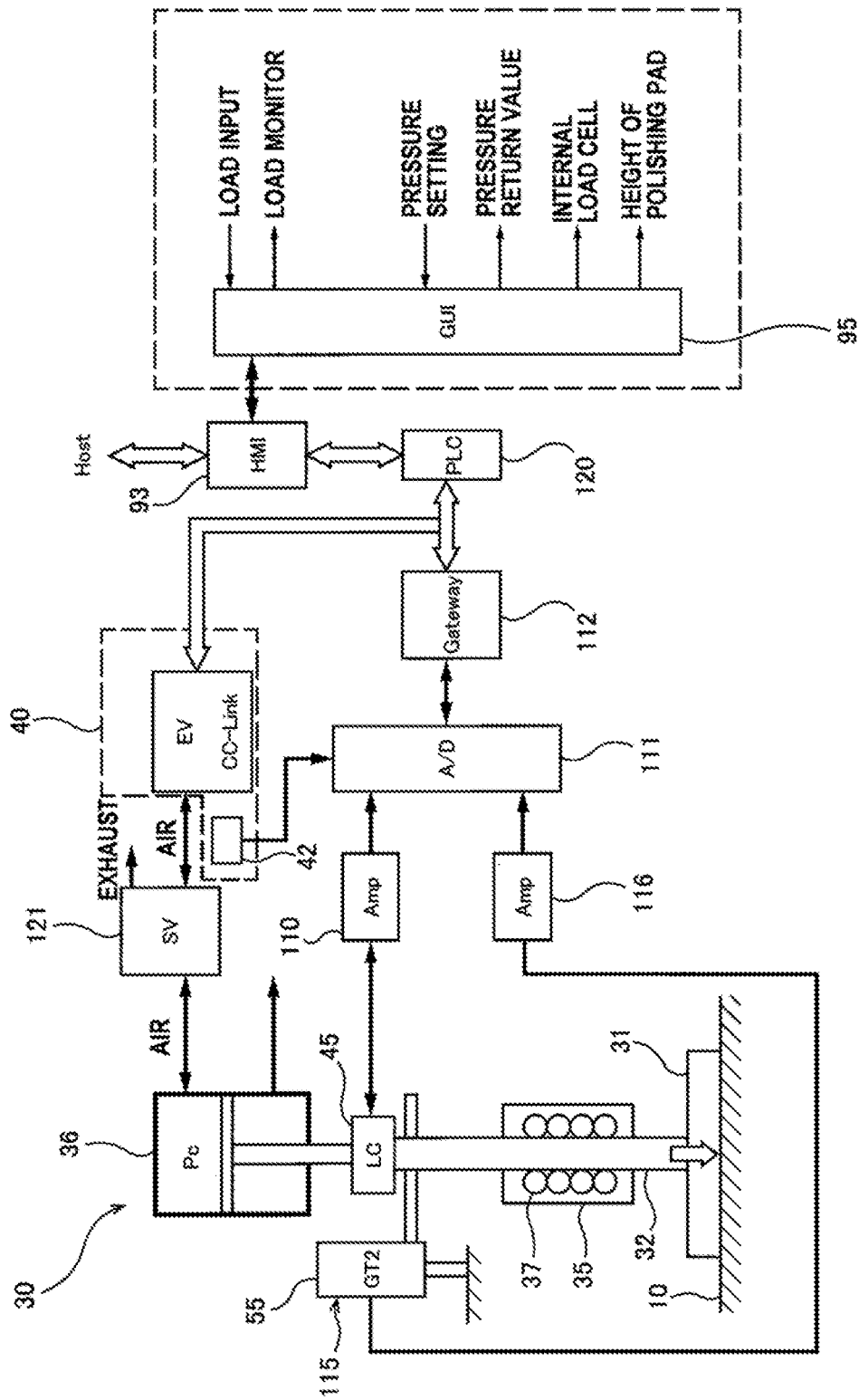
FIG. 3 is a block diagram showing a system including the dressing apparatus.

FIG. 3 is a block diagram showing a system including the dressing apparatus 30. Structures of the system in this embodiment which will not be described particularly are the same as those in the embodiment shown in FIG. 2, and will not be described in duplication.

As shown in FIG. 3, an amplifier 110 is connected to the load cell 45. Measured values of the load cell 45 are amplified by the amplifier 110. The amplified measured values are A/D (analog/digital) converted by an A/D conversion device 111, and are then sent to a control device (PLC) 120 through a gateway device 112.

An amplifier 116 is connected to the position sensor 55 of the displacement measurement device 115. Measured values of the position sensor 55 are amplified by the amplifier 116. The amplified measured values are A/D (analog/digital) converted by the A/D conversion device 111, and are then sent to the control device 120 through the gateway device 112. The electropneumatic regulator 40 is connected to the control device 120, and the control device 120 controls operation of the dressing apparatus 30 including operation of pressing the dresser 31 against the polishing pad 10.

As shown in FIG. 3, a pressure sensor 42 incorporated in the electropneumatic regulator 40 is connected to the control device 120 through the A/D conversion device 111 and the gateway device 112. Measured values of the pressure sensor 42 are sent to the control device 120.

An electromagnetic valve 121 for opening and closing a flow path of air supplied to the air cylinder 36 is provided adjacent to the electropneumatic regulator 40. This electromagnetic valve 121 is disposed between the air cylinder 36 and the electropneumatic regulator 40. The electropneumatic regulator 40 is connected to the air cylinder 36 through the electromagnetic valve 121. Supply of air to the air cylinder 36, i.e., a vertical movement of the dresser drive shaft 32 by the air cylinder 36 is controlled by opening and closing of the electromagnetic valve 121. In other words, the electromagnetic valve 121 allows or shuts off passage of air having a pressure regulated by the electropneumatic regulator 40 by opening and closing of the electromagnetic valve 121.

A HMI (human-machine interface) 93 such as a keyboard for inputting information necessary for performing a calibration program for determining a relationship between the load of the dresser 31 and the pressure of air supplied to the air cylinder 36 is connected to the control device 120. A GUI (graphical user interface) 95 is connected to the HMI 93.

In the embodiment shown in FIG. 3, a user can input commands including load settings for the dresser 31 and pressure settings for the electropneumatic regulator 40 through the HMI 93 and/or the GUI 95. Information including monitoring information of the load of the dresser 31, pressure values of air returned from the air cylinder 36 to the electropneumatic regulator 40 (i.e., measured values of the pressure sensor 42), the measured values of the load cell 45, and heights of the polishing pad 10 is displayed on the GUI 95. Information other than the above information (for example, measured values of the position sensor 55 and measured values of a load cell 145 (described below)) may be displayed on the GUI 95.

When the pressure of air supplied to the air cylinder 36 is determined, the control device 120 issues a command to the electropnuematic regulator 40 so that air having the determined pressure Pc is supplied to the air cylinder 36. In this manner, the air cylinder 36 applies a downward force to the dresser 31, and the dresser 31 presses the polishing pad 10 with a desired force.

Figure 4:
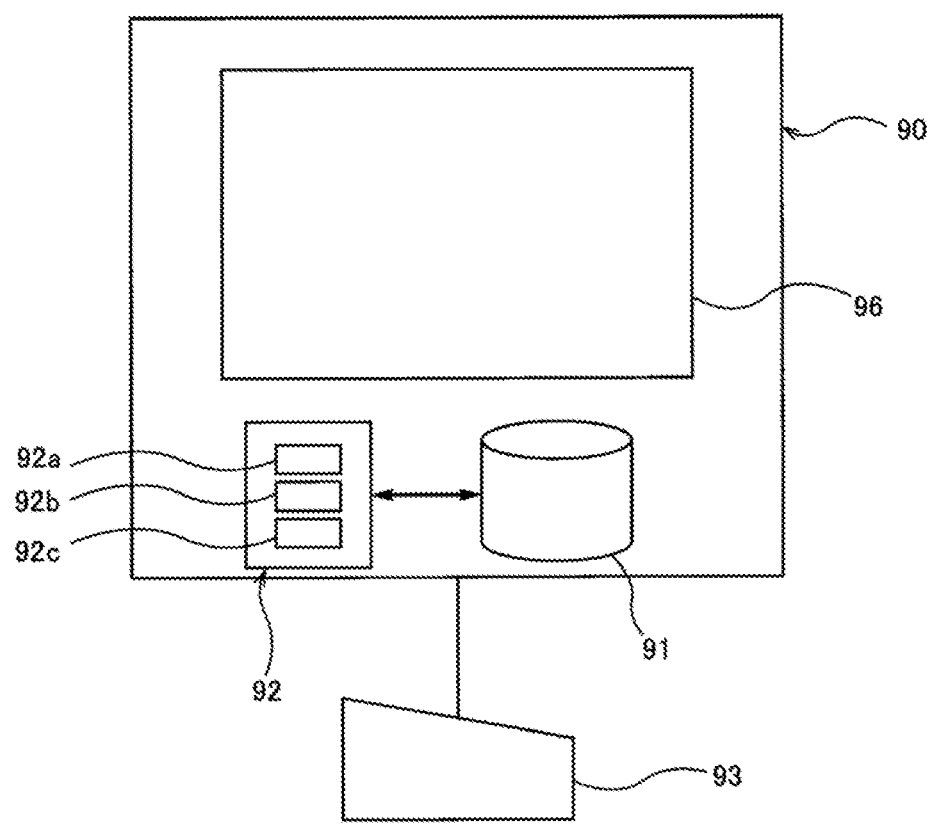
FIG. 4 is a schematic view showing an example of a computer for performing a calibration program.

Next, the calibration program will be described. FIG. 4 is a schematic view showing an example of a computer for performing the calibration program. As shown in FIG. 4, the computer 90 includes a storage device 91 such as a hard disk drive for storing therein the calibration program, and an arithmetic device 92 for processing the calibration program. The arithmetic device 92 comprises a CPU (Central Processing Unit) 92a, a ROM (Read Only Memory) 92b, a RAM (Random Access Memory) 92c, and the like. The computer 90 is connected to the control device 120 via the HMI 93.

The arithmetic device 92 determines the relationship between the load of the dresser 31 and the pressure of air supplied to the air cylinder 36 based on the calibration program stored in the storage device 91. The calibration program, which is performed by the computer 90, may be stored into the storage device 91 from a recording medium readable by the computer 90, or may be stored into the storage device 91 through a communication network such as the Internet. Examples of the computer-readable recording medium include a CD-ROM (Compact Disk Read Only Memory), a DVD (Digital Versatile Disk), an MO (Magneto Optical Disk), and a memory card.

Figure 5:
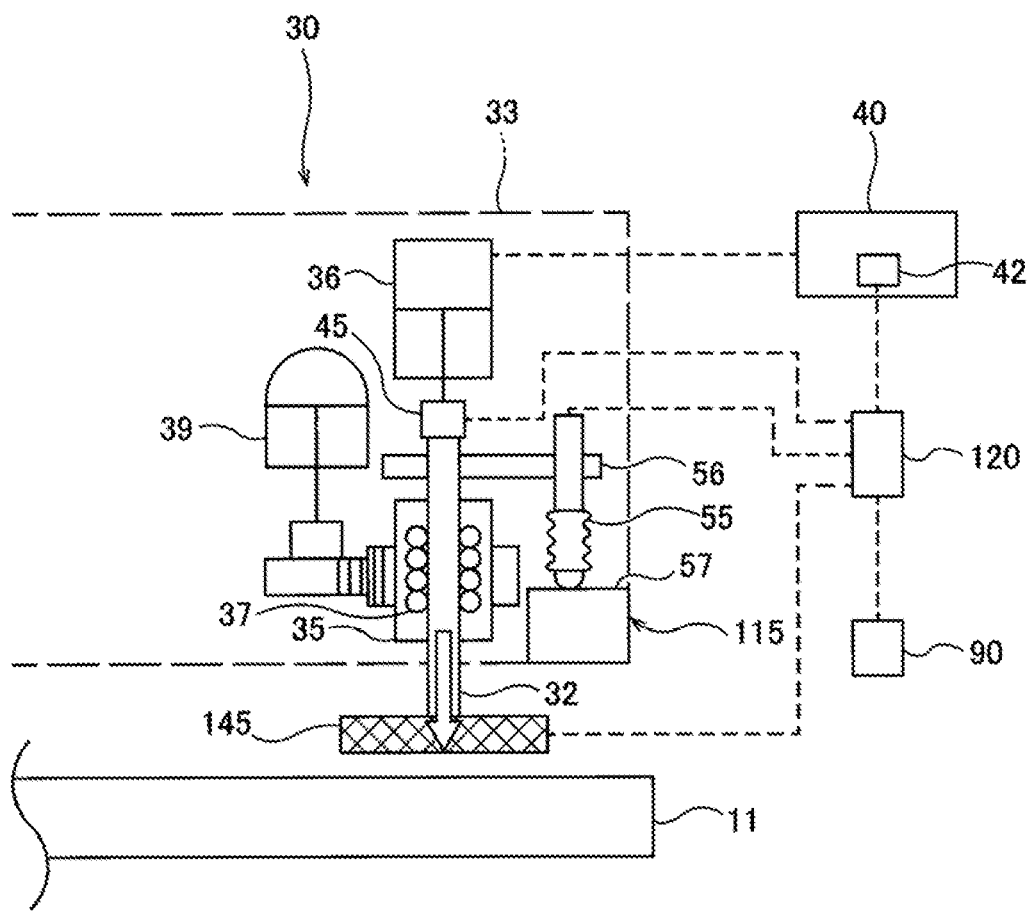
FIG. 5 is a schematic view showing the dressing apparatus in which a load cell is attached to a dresser drive shaft instead of the dresser.

A method of determining the relationship between the load of the dresser 31 and the pressure of air supplied to the air cylinder 36 (i.e., calibration method) will be described. FIG. 5 is a schematic view showing the dressing apparatus 30 in which the load cell 145 is attached to the dresser drive shaft 32 instead of the dresser 31.

In FIG. 5, the load cell 145 is attached to the dresser drive shaft 32 instead of the dresser 31, and the polishing pad 10 is not attached to the upper surface of the polishing table 11. The load cell 145 is connected to the control device 120, as with the load cell 45. The load cell 145 measures a pressing force of the load cell 145 against the polishing table 11, i.e., a load of the load cell 145. The load cell 145 may be referred to as a load measurement device (more specifically, an external load measurement device) or an external load cell. In the embodiment shown in FIG. 5, the spring 37 balances a weight of a movable portion including the dresser drive shaft 32 and the load cell 145 in the dressing apparatus 30.

Figure 6:
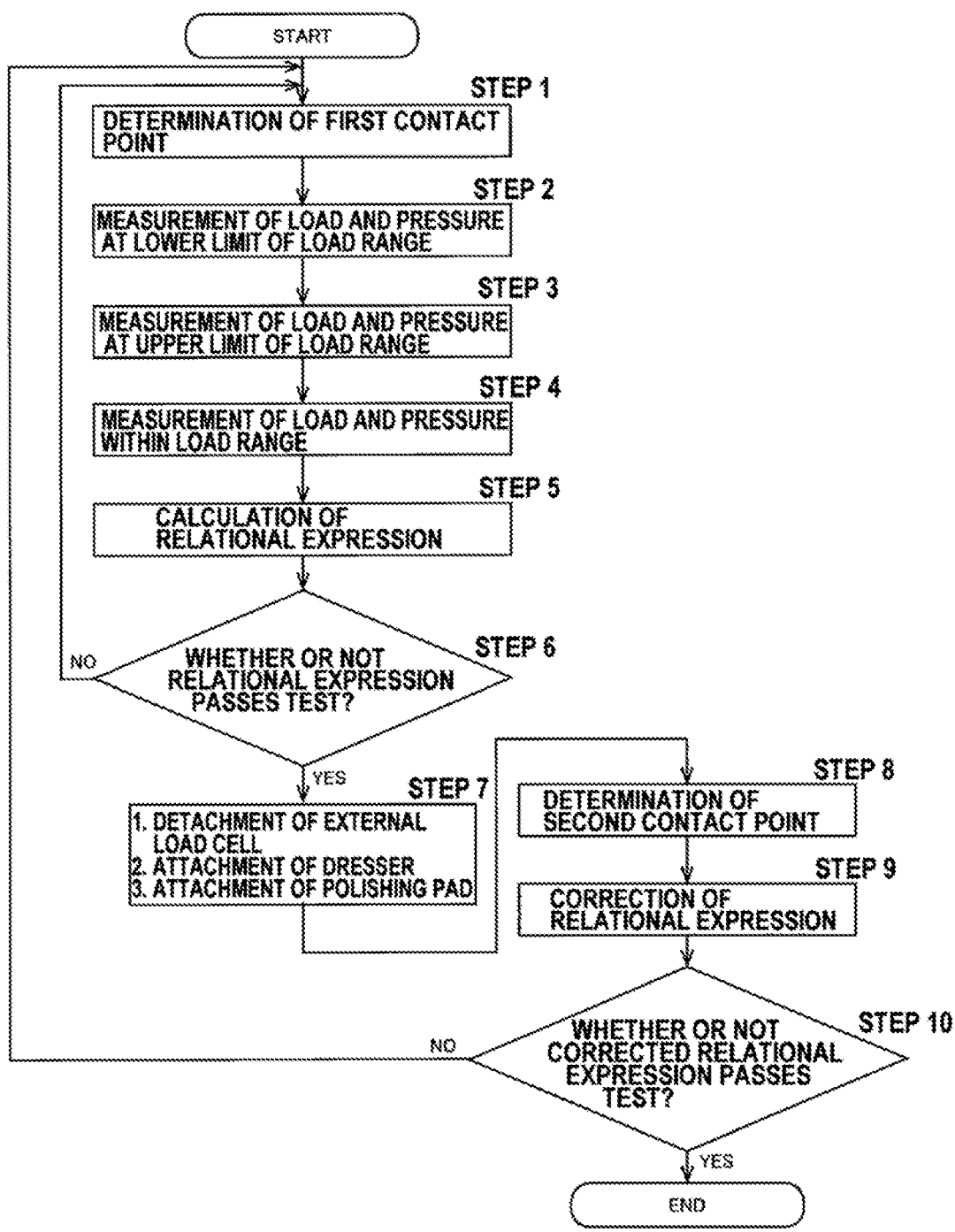
FIG. 6 is a view showing a flowchart illustrating a calibration method.

FIG. 6 is a view showing a flowchart illustrating the calibration method. First, as shown in step 1 in FIG. 6, a first contact point where the load cell 145 is brought into contact with the polishing table 11 is determined. A method of determining this first contact point will be described below.

Figure 7:
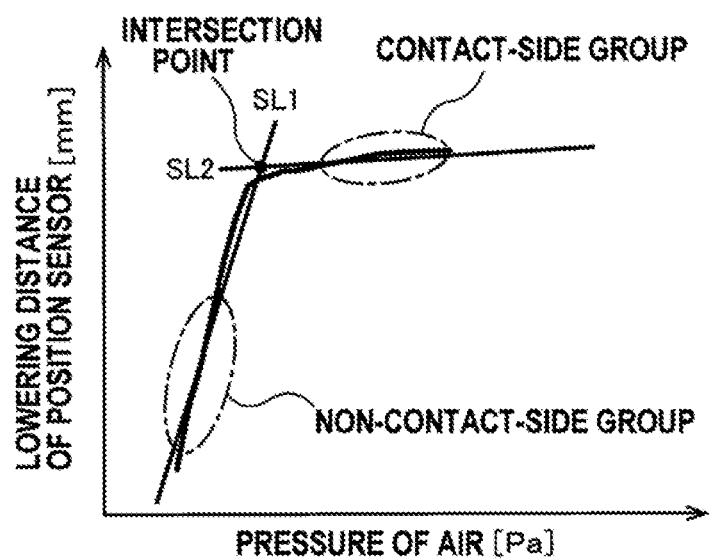
FIG. 7 is a graph showing a relationship between a lowering distance of a position sensor and a pressure of air supplied to an air cylinder.

FIG. 7 is a graph showing a relationship between a lowering distance of the position sensor 55 and a pressure of air supplied to the air cylinder 36. The horizontal axis (X axis) represents a pressure [Pa] of air supplied to the air cylinder 36, and the vertical axis (Y axis) represents a lowering distance [mm] of the position sensor 55 from a predetermined position.

First, the position sensor 55 is lowered together with the dresser drive shaft 32 by the air cylinder 36, whereby the probe of the position sensor 55 is brought into contact with the sensor target 57. The above-described predetermined position is a position where the probe of the position sensor 55 is brought into contact with the sensor target 57. Therefore, when the position sensor 55 (more specifically, the probe) is in the predetermined position, the lowering distance of the position sensor 55 is zero.

Then, the dresser drive shaft 32 is further lowered by the air cylinder 36 from the predetermined position where the position sensor 55 is brought into contact with the sensor target 57. A lowering distance of the load cell 145 from the predetermined position can be indirectly measured by measuring the displacement of the position sensor 55.

The load cell 145 is lowered through the dresser drive shaft 32 by the air cylinder 36, whereby the load cell 145 is brought into contact with the polishing table 11. As shown in FIG. 7, while changing the pressure of air supplied to the air cylinder 36, the lowering distance of the load cell 145 from the predetermined position is measured a plurality of times. There is a correlation between the lowering distance of the load cell 145 from the predetermined position, and the pressure of air supplied to the air cylinder 36 when lowering the load cell 145. Therefore, the first contact point where the load cell 145 is brought into contact with the polishing table 11 is determined based on this correlation.

As shown in FIG. 7, in a curved line showing the relationship between the pressure of air and the lowering distance of the position sensor 55, there is an inflection point (change point) at which a slope of the curved line changes greatly. The reason for this is as follows: When the load cell 145 is lowered by the air cylinder 36, a lower surface of the load cell 145 eventually comes into contact with the upper surface of the polishing table 11. Then, the lowering distance of the load cell 145, i.e., the lowering distance of the position sensor 55 becomes small. As a result, as shown in FIG. 7, the slope of the curved line greatly changes. In this embodiment, the first contact point where the load cell 145 is brought into contact with the polishing table 11 can be determined by determining the inflection point.

In order to determine the inflection point shown in FIG. 7, the computer 90 divides a plurality of data points on a coordinate system specified from the lowering distance of the load cell 145 and the pressure of air into two groups. More specifically, the plural data points are divided into a non-contact-side group where the load cell 145 is definitely out of contact with the polishing table 11 and a contact-side group where the load cell 145 is definitely in contact with the polishing table 11. The non-contact-side group includes data points immediately after the start of measurement, and the contact-side group includes data points immediately before the termination of measurement. The coordinate system is an XY coordinate system having an X axis representing the pressure [Pa] of air supplied to the air cylinder 36 and a Y axis representing the lowering distance [mm] of the position sensor 55.

The computer 90 performs a regression analysis on the plural data points belonging to the non-contact-side group to determine a first regression line represented by a linear function (see SL1 in FIG. 7). Similarly, the computer 90 performs the regression analysis on the plural data points belonging to the contact-side group to determine a second regression line represented by a linear function (see SL2 in FIG. 7). The computer 90 finds an intersection point of the first regression line with the second regression line to determine the intersection point as the first contact point.

As an example of a method of determining a contact point where the load cell 145 is brought into contact with the polishing table 11, there is a method of determining a contact point by whether or not a sheet of paper enters a gap between the load cell 145 and the polishing table 11. However, in such method, the contact point is determined by an operator in a subjective manner, thus causing a variation in the contact point, and thus the contact point cannot be accurately determined in an objective manner. Furthermore, in such method, it takes time to determine the contact point. According to the embodiment, the contact point is automatically determined through the computer 90 by the above-described method. Therefore, the contact point can be accurately and promptly determined.

The number of data points as an object of the performed regression analysis may be arbitrarily determined, and the accuracy of the regression analysis can be improved by performing the regression analysis based on many more data points.

The above-described method of determining a contact point can also be applied to the case of determining a contact position between the top ring 21 and the polishing pad 10 (or polishing table 11). More specifically, a contact point where the top ring 21 is brought into contact with the polishing pad 10 can be determined from a relationship between a measured value by a displacement measurement device (not shown) for measuring a lowering distance of the top ring 21 and a measured value of the pressure of air supplied to an air cylinder (not shown) for pressing the top ring 21 against the polishing pad 10 (or the polishing table 11).

In one embodiment, the method of determining a contact point is not limited to components of the polishing apparatus. Such method can also be applied to an apparatus that needs to determine a contact point, i.e., an apparatus in which it is difficult to provide a sensor for directly detecting a contact point.

After determining the first contact point, in order to determine the relationship between the load of the load cell 145 and the pressure of air supplied to the air cylinder 36, a load range of the load cell 145 is determined. This load range is automatically determined by the computer 90. This load range may be displayed on a display device 96 provided in the computer 90 (see FIG. 4). The load range may be displayed on the GUI 125 (see FIG. 3). Information similar to the GUI 95 may be displayed on the display device 96. In one embodiment, the polishing apparatus may be provided with at least one of the display device 96 and the GUI 125.

The load range may be different depending on factors such as a variation in assembly of the dressing apparatus 30, a specification of the dressing apparatus 30, etc. Thus, it is desirable to determine the load range to be measured in consideration of such factors.

The load cell 145 is lowered by the air cylinder 36 and is thus placed at the first contact point. Then, the load cell 145 placed at the first contact point is lowered to measure the load of the load cell 145 at a lower limit of the load range and the pressure of air supplied to the air cylinder 36 at this point of time (step 2 in FIG. 6). In this manner, by placing the load cell 145 at the first contact point and then lowering the load cell 145, an influence caused by an acceleration of the load cell 145 can be removed.

Thereafter, the load cell 145 is placed at the first contact point again. Then, the load cell 145 placed at the first contact point is lowered to measure the load of the load cell 145 at an upper limit of the load range and the pressure of air supplied to the air cylinder 36 at this point of time (step 3 in FIG. 6). In this manner, the computer 90 obtains the measured value of the load cell 145 and the measured value of the pressure sensor 42 at the lower limit of the load range, and obtains the measured value of the load cell 145 and the measured value of the pressure sensor 42 at the upper limit of the load range.

As shown in step 4 in FIG. 6, the load cell 145 placed at the first contact point is pressed against the polishing table 11, and while changing the load acting on the load cell 145 within a predetermined load range, the load acting on the load cell 145 and the pressure of air supplied to the air cylinder 36 are measured. The measurement of load and pressure is performed a plurality of times within the predetermined load range. In this embodiment, the load and the pressure are measured as follows.

Figure 8:
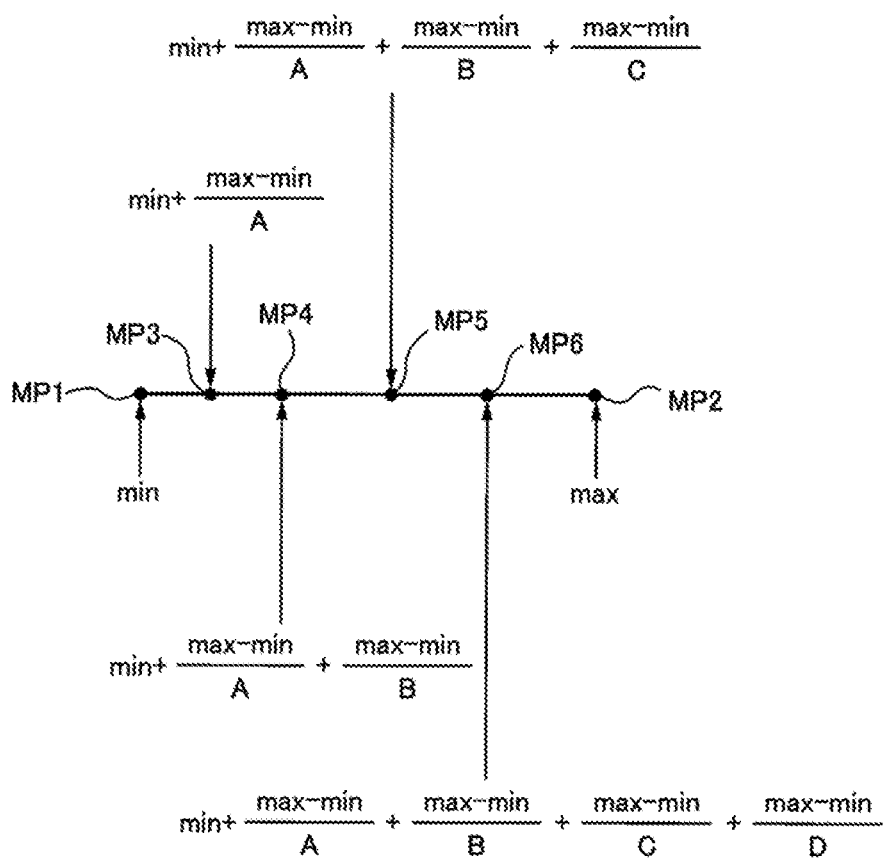
FIG. 8 is a view showing measurement of a load and a pressure within a predetermined load range.

FIG. 8 is a view showing the measurement of the load and the pressure within the predetermined load range. As shown in FIG. 8, a pressure "min" of air corresponding to the load at the lower limit of the load range is measured (first measurement point MP1), and a pressure "max" of air corresponding to the load at the upper limit of the load range is measured (second measurement point MP2).

Thereafter, the pressure is obtained by adding a numerical value obtained by dividing a difference between the pressure "max" and the pressure "min" by a constant A to the pressure "min", and the load of the load cell 145 at this point of time is measured (third measurement point MP3). The pressure at the third measurement point MP3 is represented by "min+((max−min)/A)".

Next, the pressure is obtained by adding a numerical value obtained by dividing a difference between the pressure "max" and the pressure "min" by a constant B to the pressure at the third measurement point MP3, and the load of the load cell 145 at this point of time is measured (fourth measurement point MP4). The pressure at the fourth measurement point MP4 is represented by "min+((max−min)/A)+((max−min)/B)".

Next, the pressure is obtained by adding a numerical value obtained by dividing a difference between the pressure "max" and the pressure "min" by a constant C to the pressure at the fourth measurement point MP4, and the load of the load cell 145 at this point of time is measured (fifth measurement point MP5). The pressure at the fifth measurement point MP5 is represented by "min+((max−min)/A)+((max−min)/B)+((max−min)/C)".

Next, the pressure is obtained by adding a numerical value obtained by dividing a difference between the pressure "max" and the pressure "min" by a constant D to the pressure at the fifth measurement point MP5, and the load of the load cell 145 at this point of time is measured (sixth measurement point MP6). The pressure at the sixth measurement point MP6 is represented by "min+((max−min)/A)+((max−min)/B)+((max−min)/C)+((max−min)/D)".

These constants A, B, C and D have a relationship of A≥B≥C≥D. In this embodiment, there are four constants (A, B, C, D), but the number of constants is not limited to this embodiment.

Figure 9:
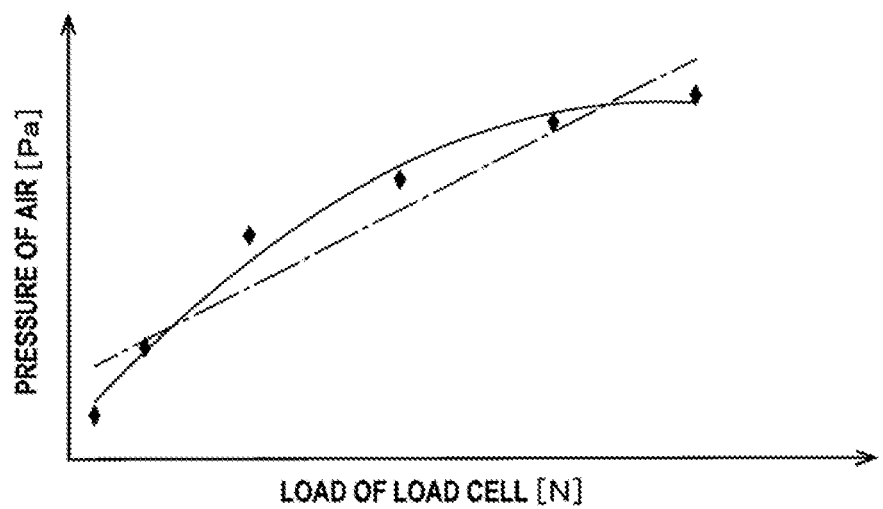
FIG. 9 is a graph showing a relationship between the pressure of air supplied to the air cylinder and the load of the load cell.

FIG. 9 is a graph showing a relationship between the pressure of air supplied to the air cylinder 36 and the load of the load cell 145. In FIG. 9, the horizontal axis (X axis) represents the load [N] of the load cell 145, and the vertical axis (Y axis) represents the pressure [Pa] of air supplied to the air cylinder 36. The coordinate system is an XY coordinate system having an X axis representing the load of the load cell 145 and a Y axis representing the pressure of air supplied to the air cylinder 36.

The computer 90 calculates a relational expression composed of a quadratic function showing the relationship between the measured load and the measured pressure based on the measured load and the measured pressure (step 5 in FIG. 6). More specifically, a process of calculating the relational expression includes performing a regression analysis on a plurality of data points on the coordinate system specified from the measured load and the measured pressure, and calculating a regression expression represented by a quadratic function to determine this regression expression as the above-described relational expression.

According to this embodiment, data points unnecessary for calculating the above-described regression expression can be reduced by determining the load range in advance. Furthermore, it is possible to measure within the load range by determining the load range regardless of the specification of the dressing apparatus 30.

As shown in step 6 in FIG. 6, the arithmetic device 92 of the computer 90 determines whether or not the relational expression (more specifically, the regression expression) passes a predetermined test. This determination method is as follows: The pressure of air supplied to the air cylinder 36 and the load of the load cell 145 are actually measured. The arithmetic device 92 compares actual measured values with numerical values calculated by the regression expression to judge whether or not differences between the actual measured values and the numerical values calculated from the regression expression are within the predetermined range. In one embodiment, the actual measured values are numerical values measured at points other than the data points specified when calculating the regression expression.

If the regression expression fails the predetermined test (NO in step 6), i.e., if the differences are not within a predetermined range, returning back to step 1, the process of determining the first contact point is performed again. If the regression expression passes the predetermined test (YES in step 6), i.e., if the differences are within the predetermined range, the computer 90 determines the relationship between the load of the load cell 145 and the pressure of air supplied to the air cylinder 36. The fact that the differences are within the predetermined range means that the relationship between the load of the load cell 145 and the pressure of air supplied to the air cylinder 36 is correct and accurately determined.

As shown in step 7 in FIG. 6, an operation of detaching the load cell 145 from the dresser drive shaft 32, attaching the dresser 31 to the dresser drive shaft 32, and attaching the polishing pad 10 to the polishing table 11 is performed. After the completion of step 7, a process of correcting the relational expression (more specifically, regression expression) is performed.

In this embodiment, as shown by a solid line in FIG. 9, the regression analysis is performed on the plural data points to calculate a relational expression represented by a quadratic function and to determine a regression curve. A chain line in FIG. 9 corresponds to a regression line determined by performing the regression analysis on the plural data points and calculating a regression expression represented by a linear function. This regression line is shown as a comparative example to this embodiment.

According to this embodiment, differences corresponding to distances between the regression curve and the data points are smaller than the differences corresponding to the distances between the regression line and the data points. In this manner, the computer 90 performs the regression analysis on the plural data points to calculate the relational expression represented by the quadratic function, so that the regression curve can be fitted to the data points. Therefore, the relationship between the load of the load cell 145 and the pressure of air supplied to the air cylinder 36 can be accurately determined. Thus, the differences between the numerical values calculated from the relational expression and the actual measured values can be made smaller, and there is a high possibility that the relational expression passes the predetermined test. As a result, there is no need to perform the step 1 in FIG. 6 again, and the calibration operation can be efficiently performed in a short time.

The constants A, B, C and D preferably have a relationship of A>B>C>D. More preferably, when the determined load range is divided into a low-load-side group and a high-load-side group, a difference of constants belonging to the low-load-side group is smaller than a difference of constants belonging to the high-load-side group. In one embodiment, a predetermined dividing point, is used as a boundary, and a group close to the lower limit of the load range is specified as the low-load-side group and a group close to the upper limit of the load range is specified as the high-load-side group.

In this manner, since the plural data points are concentrated on the low-load-side group by holding the relationship of the constants A, B, C and D, the regression curve can be better fitted to the data points. Therefore, the differences corresponding to the distances between the regression curve and the data points can become smaller.

After terminating step 7 in FIG. 6, the relationship between the load of the dresser 31 (i.e., load of the load cell 45) and the pressure supplied to the air cylinder 36 is determined in a state where the dresser 31 is attached to the dresser drive shaft 32 instead of the load cell 145 and the polishing pad 10 is attached to the upper surface of the polishing table 11.

As shown in step 8 in FIG. 6, a second contact point where the dresser 31 is brought into contact with the polishing surface of the polishing pad 10 is determined based on the relationship between a displacement of the position sensor 55 (i.e., lowering distance of the dresser 31) and the pressure of air supplied to the air cylinder 36. This second contact point is determined by a method similar to the above-described method (i.e., method for determining the first contact point) (see FIG. 7).

Hereinafter, in this specification, the pressure of air supplied to the air cylinder 36 at the first contact point where the load cell 145 is brought into contact with the polishing table 11 is defined as P1. The pressure of air supplied to the air cylinder 36 at the second contact point where the dresser 31 is brought into contact with the polishing surface of the polishing pad 10 is defined as P2. A difference between the pressure P2 and the pressure P1, i.e., an amount of correction is defined as ΔP (i.e., P2−P1).

As shown in step 9 in FIG. 6, the relational expression showing the relationship between the load of the load cell 145 and the pressure of air supplied to the air cylinder 36 is corrected. The computer 90 calculates the amount of correction ΔP from the pressure P1 of air at the first contact point and the pressure P2 of air at the second contact point and corrects the relational expression based on the calculated amount of correction ΔP. A method of correcting this relational expression will be described with reference to FIG. 10.

Figure 10:
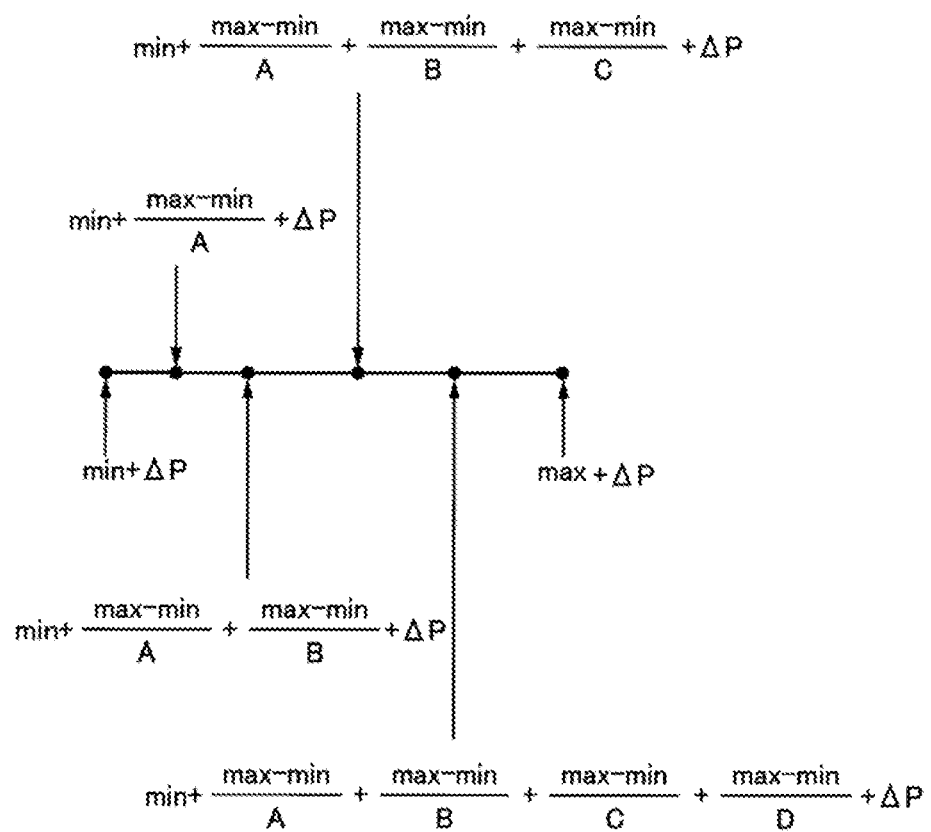
FIG. 10 is a view illustrating a method of correcting a relational expression.

FIG. 10 is a view illustrating a method of correcting the relational expression. As shown in FIG. 10, the amount of correction ΔP is added to the measured pressure "min" to obtain (min+ΔP). The pressure to which the amount of correction ΔP is added and the load acting on the dresser 31 (i.e., the load of the load cell 45) when air having a pressure to which the amount of correction ΔP is added is supplied to the air cylinder 36 are measured.

Similarly, the amount of correction ΔP is added to the pressure "min+((max−min)/A)". The pressure to which the amount of correction ΔP is added and the load acting on the dresser 31 when air having a pressure to which the amount of correction ΔP is added is supplied to the air cylinder 36 are measured. The pressure at this point of time is represented by "min+((max−min)/A)+ΔP".

Thereafter, in a similar manner, the amount of correction ΔP is added to the pressure, and the pressure to which the amount of correction ΔP is added and the load acting on the dresser 31 when air having a pressure to which the amount of correction ΔP is added is supplied to the air cylinder 36 are measured. The pressures at these points of time are represented by "min+((max−min)/A)+((max−min)/B)+ΔP", "min+((max−min)/A)+((max−min)/B)+((max−min)/C)+ΔP", "min+((max−min)/A)+((max−min)/B)+((max−min)/C)+((max−min)/D)+ΔP", and "max+ΔP".

Thereafter, the computer 90 performs the regression analysis on a plurality of data points on the coordinate system specified from the pressure to which the amount of correction ΔP is added and the corresponding load to calculate a new relational expression composed of a quadratic function. This new relational expression is a corrected relational expression obtained by correcting the relational expression showing the relationship between the load of the load cell 145 and the pressure of air supplied to the air cylinder 36.

As shown in step 10 in FIG. 6, the arithmetic device 92 of the computer 90 determines whether or not the corrected relational expression passes a predetermined test. This determination is performed in a method similar to the above-described determination method. Specifically, the arithmetic device 92 of the computer 90 compares the numerical values calculated by the corrected relational expression with the actual measured values, and determines whether or not differences between the numerical values calculated by the corrected relational expression and the actual measured values are within a predetermined range.

If the corrected relational expression fails the predetermined test (NO in step 10), i.e., if the differences are not within the predetermined range, returning back to step 1, the process of determining the first contact point is performed again. If the corrected relational expression passes the predetermined test (YES in step 10), i.e., if the differences are within the predetermined range, the computer 90 determines the relationship between the load of the dresser 31 and the pressure of air supplied to the air cylinder 36 and terminates the calibration operation. The fact that the differences are within the predetermined range means that the relationship between the load of the dresser 31 and the pressure of air supplied to the air cylinder 36 is correct and accurately determined.

According to this embodiment, the first contact point and the second contact point can be accurately determined, and the relational expression composed of the quadratic function showing the relationship between the measured load and the measured pressure and the corrected relational expression can be better fitted to the plural data points (i.e., actual measured value). Therefore, the relationship between the load of the dresser 31 and the pressure of air supplied to the air cylinder 36 can be accurately determined in a short time.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

What is claimed is:

1. A method of determining a relationship between a load of a dresser applied by an air cylinder and a pressure of a gas supplied to the air cylinder, comprising:
   lowering a load measurement device attached to a vertically-movable dresser drive shaft by the air cylinder when a polishing pad is not attached to a polishing table to bring the load measurement device into contact with the polishing table;
   determining a first contact point where the load measurement device is brought into contact with the polishing table based on a relationship between a lowering distance of the load measurement device from a predetermined position and the pressure of the gas supplied to the air cylinder when lowering the load measurement device;
   pressing the load measurement device at the first contact point against the polishing table, and measuring a load acting on the load measurement device and the pressure of the gas while changing the load acting on the load measurement device within a predetermined load range;
   calculating a relational expression composed of a quadratic function showing a relationship between the measured load and the measured pressure; then
   determining a second contact point where the dresser is brought into contact with a polishing surface of the polishing pad after attaching the dresser to the dresser drive shaft instead of the load measurement device and attaching the polishing pad to an upper surface of the polishing table;
   pressing the dresser at the second contact point against the polishing pad, and measuring the pressure of the gas supplied to the air cylinder while pressing the dresser at the second contact point;
   calculating an amount of correction, wherein the calculated amount of correction is determined from the pressure of the gas at the first contact point and the pressure of the gas at the second contact point; and
   correcting the relational expression based on the calculated amount of correction.

2. The method according to claim 1, wherein the determining the first contact point comprises:
   measuring the lowering distance of the load measurement device from the predetermined position a plurality of times, while changing the pressure of the gas supplied to the air cylinder;
   dividing a plurality of data points on a coordinate system specified from a measured lowering distance of the load measurement device and the corresponding pressure of the gas corresponding to the lowering distance into a non-contact-side group including a data point immediately after starting of the measurement and a contact-side group including a data point immediately before terminating of the measurement;
   performing a regression analysis on the plural data points belonging to the non-contact-side group to determine a first regression line represented by a linear function;
   performing the regression analysis on the plural data points belonging to the contact-side group to determine a second regression line represented by a linear function; and
   finding an intersection point of the first regression line with the second regression line to determine the intersection point as the first contact point.

3. The method according to claim 1, wherein the calculating the relational expression comprises performing a regression analysis on a plurality of data points on a coordinate system specified from the measured load and the measured pressure at the first contact point to calculate a regression expression represented by the quadratic function, and determining the regression expression as the relational expression.

4. The method according to claim 1, wherein the correcting the relational expression comprises:
   adding the calculated amount of correction to the measured pressure to determine a second pressure;
   measuring the second pressure and a second load acting on the dresser when the gas having the second pressure is supplied to the air cylinder;
   performing a regression analysis on a plurality of data points on a coordinate system specified from the second pressure and the measured second load corresponding to the second pressure to calculate a new relational expression composed of a second quadratic function; and
   correcting the relational expression into the new relational expression.

5. A non-transitory computer-readable storage medium storing a program of determining a relationship between a load of a dresser applied by an air cylinder and a pressure of a gas supplied to the air cylinder, the program for causing a computer to perform steps comprising:
   performing an operation of lowering a load measurement device attached to a vertically-movable dresser drive shaft by the air cylinder when a polishing pad is not attached to a polishing table to bring the load measurement device into contact with the polishing table;
   determining a first contact point where the load measurement device is brought into contact with the polishing table based on a relationship between a lowering distance of the load measurement device from a predetermined position and the pressure of the gas supplied to the air cylinder when lowering the load measurement device;
   calculating a relational expression composed of a quadratic function showing a relationship between a measured load and a measured pressure based on the measured load acting on the load measurement device and the pressure of the gas, while changing the load acting on the load measurement device within a predetermined load range by pressing the load measurement device at the first contact point against the polishing table;
   determining a second contact point where the dresser attached to the dresser drive shaft instead of the load measurement device is brought into contact with a polishing surface of the polishing pad attached to an upper surface of the polishing table;

pressing the dresser at the second contact point against the polishing pad, and measuring the pressure of the gas supplied to the air cylinder while pressing the dresser at the second contact point;

calculating an amount of correction, wherein the amount of calculated correction is determined from the pressure of the gas at the first contact point and the pressure of the gas at the second contact point; and correcting the relational expression based on the calculated amount of correction.

6. The storage medium according to claim 5, wherein the determining the first contact point comprises:

dividing a plurality of data points on a coordinate system specified from a lowering distance of the load measurement device from the predetermined position measured a plurality of times and the corresponding pressure of the gas corresponding to the lowering distance into a non-contact-side group including a data point immediately after starting of the measurement and a contact-side group including a data point immediately before terminating of the measurement;

performing a regression analysis on the plural data points belonging to the non-contact-side group to determine a first regression line represented by a linear function;

performing the regression analysis on the plural data points belonging to the contact-side group to determine a second regression line represented by the linear function; and finding an intersection point of the first regression line with the second regression line to determine the intersection point as the first contact point.

7. The storage medium according to claim 5, wherein the calculating the relational expression comprises performing a regression analysis on a plurality of data points on a coordinate system specified from the measured load and the measured pressure at the first contact point to calculate a regression expression represented by the quadratic function, and determining the regression expression to the relational expression.

8. The storage medium according to claim 5, wherein the correcting the relational expression comprises:

adding the calculated amount of correction to the measured pressure to determine a second pressure;

performing a regression analysis on a plurality of data points on a coordinate system specified from the second pressure and a second load acting on the dresser when the gas having the second pressure is supplied to the air cylinder to calculate a new relational expression composed of a second quadratic function; and correcting the relational expression into the new relational expression.

* * * * *